United States Patent [19]
Garcia-Mallol

[11] Patent Number: 5,269,263
[45] Date of Patent: Dec. 14, 1993

[54] FLUIDIZED BED REACTOR SYSTEM AND METHOD OF OPERATING SAME

[75] Inventor: Juan A. Garcia-Mallol, Morristown, N.J.

[73] Assignee: Foster Wheeler Energy Corporation, Clinton, N.J.

[21] Appl. No.: 943,620

[22] Filed: Sep. 11, 1992

[51] Int. Cl.⁵ .................................................. F22B 11/00
[52] U.S. Cl. .................................. 122/4 D; 110/245; 165/104.16; 422/146
[58] Field of Search ....................... 122/4 D; 110/245; 165/104.14; 422/146

[56] References Cited

U.S. PATENT DOCUMENTS

| | | |
|---|---|---|
| 4,419,965 | 12/1983 | Garcia-Mallol et al. .......... 122/4 D |
| 4,552,203 | 11/1985 | Chrysostome et al. . |
| 4,709,662 | 12/1987 | Rawdon . |
| 4,709,663 | 12/1987 | Larson et al. . |
| 4,777,889 | 10/1988 | Smith . |
| 4,784,533 | 11/1988 | Teigen . |
| 4,813,479 | 3/1989 | Wahlgren . |
| 4,979,448 | 12/1990 | Sheely et al. . |
| 5,012,750 | 5/1991 | Sheely et al. . |
| 5,069,170 | 12/1991 | Gorzegno et al. .................. 122/4 D |
| 5,133,943 | 7/1992 | Abdulally ...................... 122/4 D X |

Primary Examiner—Edward G. Favors
Attorney, Agent, or Firm—Marvin A. Naigur

[57] ABSTRACT

A fluidized bed reactor system and method of operating same, in which a fluidized bed of fine particles is combusted in a reactor forming a mixture of flue gases and relatively fine particles entrained by the flue gases. The mixture is passed to a separator which separates the entrained fine particles from the flue gases. The flue gases are passed to a heat recovery area for the extraction of thermal energy and the separated fine particles are collected in a dipleg seal. A portion of the separated fine particles is passed to the reactor and the remaining portion is discharged to the heat recovery area where the fine particles mix with the flue gases and heat is recovered from the latter mixture.

16 Claims, 1 Drawing Sheet

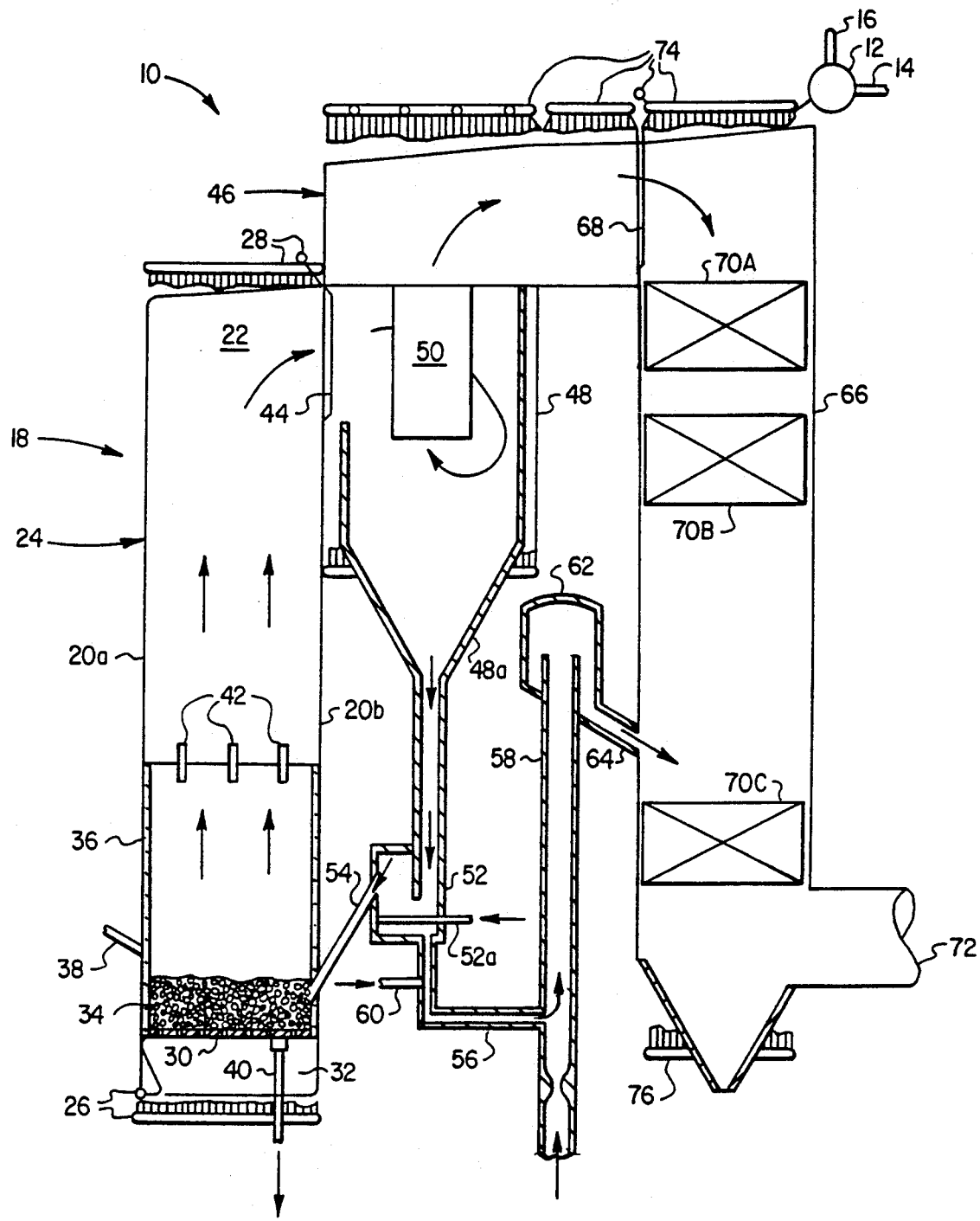

FLUIDIZED BED REACTOR SYSTEM AND METHOD OF OPERATING SAME

FIELD OF THE INVENTION

The invention relates to a fluidized bed reactor system and a method of operating same, and, more particularly, to such a system and method in which heat is generated by the combustion of fuel in a fluidized bed.

Fluidized bed reactors, such as, combustors, gasifiers, steam generators and the like are well known. In these arrangements, air is passed through a bed of particulate materials, including a fossil fuel, such as coal, and absorbent material for the sulfur oxides generated as a result of combustion of the coal, to fluidize the bed and the promote the combustion of the fuel at a relatively low temperature. When heat produced by the fluidized bed is utilized to convert water to steam, such as in a steam generator, the fluidized bed system offers an attractive combination of high heat release, high sulfur oxides absorption, low nitrogen oxides emissions and fuel flexibility.

In certain cases, a circulating fluidized bed reactor is used in which a gas column is formed above a fluidized bed which contains a mixture of air, the gaseous products of combustion from the fluidized bed, and relatively fine particles entrained by the air and the gaseous products of combustion. The mixture is discharged from the reactor and the fine particles are separated from the mixture. A portion of the separated fine particles are injected back into the bed, and the remaining portion is passed to external equipment.

As the chemical reactions within the fluidized bed take place at relatively high temperatures, the separated fine particles can be passed into a heat exchanger to recover heat from the material before it is recycled or discharged to external equipment. For example, U.S. Pat. No. 5,069,171, assigned to the assignee of the present application, discloses the use of an external heat exchanger for the recovery of heat from the separated fine particles prior to the fine particles being recycled back to the fluidized bed. This recovery of heat from the separated fine particles in the external heat exchanger is usually accomplished by providing an additional fluidized bed operating at a lower pressure than in the reactor vessel. The use of a fluidized bed within the external heat exchanger, however, can result in the segregation of relatively large particles, and consequently, the accumulation of relatively coarse and fine particles within the reactor vessel. The build-up of the fine particles within the reactor vessel reduces the residence time of other particles and results in a significant reduction in the operating efficiency of circulating fluidized bed reactors.

SUMMARY OF THE INVENTION

It is therefore an object of the present invention to provide a system and method of operating a circulating fluidized bed with an external heat exchanger that limits the build up of fine particles.

It is still a further object of the present invention to provide a system and method of the above type in which the ratio of relatively course to relatively fine particles can be regulated.

It is still a further object of the present invention to provide a system and method of the above type which provides increased operational efficiency.

It is a still further object of the present invention to provide a system and method of the above type in which heat is extracted from the discharged fine particles.

Toward the fulfillment of these and other objects, a gas column is formed above a fluidized bed which contains a mixture of air, the gaseous products of combustion from the fluidized bed, and fine particles from the bed. A portion of the particles is coarse enough to continuously stay in the bed, while the rest is fine enough to be entrained by the air and gaseous products of combustion. The gas column is saturated with fine particles which are separated from the mixture. A portion of the separated fine particles is injected back into the bed to maintain saturation and the remaining portion is mixed with the reactor exit gases before discharging through a heat exchanger which recovers heat from the mixture.

BRIEF DESCRIPTION OF THE DRAWINGS

The above brief description as well as further objects, features and advantages of the system and method of the present invention will be more fully appreciated by reference to the following detailed description of presently preferred but nonetheless illustrative embodiment in accordance with the present invention when taken in conjunction with the accompanying drawing which is a schematic view depicting a circulating fluidized bed reactor system of the present invention.

DESCRIPTION OF THE PREFERRED EMBODIMENT

The system and method of the present invention will be described in connection with a natural water circulation steam generator, shown in general by the reference number 10 in the drawing. The steam generator 10 includes a steam drum 12 which receives water from a feed pipe 14 and which discharges the steam generated via a plurality of steam pipes 16.

The steam generator 10 includes a fluidized bed reactor 18 having a front wall 20A, a spaced, parallel rear wall 20B, and two spaced, side walls, one of which is shown by the reference numeral 22, which extend perpendicular to the front and rear walls to form a substantially rectangular furnace 24.

The walls 20a, 20b, and 22 of the reactor 18 are formed by a plurality of vertically-disposed tubes interconnected by vertically-disposed elongated bars, or fins, to form a contiguous, air-tight structure. Since this type of structure is conventional, it is not shown in the drawing nor will it be described in any further detail. The ends of each of the tubes of the walls 20A, 20B, and 22 are connected to horizontally-disposed lower and upper headers 26 and 28, respectively, for reasons that will be explained later.

A perforated air distribution plate 30 is suitably supported at the lower portion of the combustion chamber of the reactor 18, and defines a plenum chamber 32 extending below the plate. Pressurized air from a suitable source (not shown) is introduced into the plenum chamber 32 by conventional means, such as a forced-draft blower, or the like, and passes in an upwardly direction through the air distribution plate 30. The air may be preheated by air preheaters (not shown) and appropriately regulated by air control dampers as needed. The air distribution plate 30 is adapted to support a bed 34 of relatively fine and coarse particles consisting, in general, of crushed coal and limestone, or dolomite, for absorbing the sulfur oxides formed during the combustion of the coal.

The inner surfaces of the lower portion of the walls 20a, 20b, and 22 of the reactor 18, are lined with a refractory 36, or other suitable insulating material, which extends a predetermined distance above the air distribution plate 30.

A fuel distributor 38 extends through the front wall 20a for introducing particulate fuel onto the upper surface of the bed 34, it being understood that other distributors can be associated with the walls 20a, 20b and 22 for distributing particulate, sulfur-oxides sorbent material and/or additional particulate fuel material onto the bed 34, as needed.

A drain pipe 40 registers with an opening in the air distribution plate 30 and extends through the plenum chamber 32 for discharging relatively coarse particles, consisting of spent fuel and sorbent material from the bed 34 to external equipment and may be appropriately regulated by control valves (not shown) as needed.

A multiplicity of air ports 42 are provided through the side wall 22 at a predetermined elevation from the bed 34 to introduce secondary air into the boiler for reasons to be described. It is understood that additional air ports at one or more elevations can be provided through the walls 20a, 20b, and the other side wall as needed.

An opening 44 is formed in the upper portion of the rear wall 20b by bending back some of the tubes forming the latter wall to communicate the upper portion of furnace 24 with a separating section 46 disposed adjacent the reactor 18. A cyclone separator 48 forms the outer portion of the separating section 46 and includes a coaxially disposed inner tube 50 which, together with the wall of the separator, form an annular flow path for the gases entering the separator from the reactor 18. The latter gases swirl around in the annular chamber to separate the entrained fine particles therefrom by centrifugal forces, before the gases pass to the upper portion of the separating section.

The separated fine particles fall into a lower hopper portion 48a of the separator 48 and are passed to a dipleg seal 52 which is aerated in a conventional manner by an air injector 52a, and which has a recycle conduit 54 and an L-valve 56 extending therefrom. The conduit 54 extends through the rear wall 20b and into the reactor 18, and a vertically-extending pneumatic lift 58 is connected to the distal end of the L-valve 56 and provides for the pneumatic transport of discharged fine particles. The L-valve 56 is provided with a aeration tap 60 which introduces air into the L-valve to vary the proportional flow of the fine particles between the conduit 54 and the pneumatic lift 58. The pneumatic lift 58 terminates in a flow reversal vessel 62 connected to an injection line(s) 64 which provides for the discharge of the fine particles, as will be described in further detail.

A heat recovery enclosure 66 is formed adjacent the separating section 46 and has an opening 68 formed in an upper wall portion which receives the clean gases from the separating section 46. Superheaters 70A and 70B and a heat exchanger 70C are disposed in the heat recovery enclosure 66 and each consists of a plurality of tubes connected in a flow circuitry for passing steam through the tubes in a conventional manner for heat exchange. The gases from the separating section 46 pass downwardly through the length of the heat recovery enclosure 66 and thus through the superheaters 70A and 70B and the heat exchanger 70C.

The injection line(s) 64 from the flow reversal vessel extends through the side wall of the heat recovery enclosure 66 and provides for the discharge of the fine particles downstream of the superheaters 70A and 70B and upstream of the heat exchanger 70C where the fine particles mix with the gases from the separating section 46. Thus, the heat exchanger 70C is disposed in the path of the mixture of the gases and the discharged fine particles and provides for additional heat recovery from the mixture.

Since the heat exchanger 70C can be of a conventional design it is not shown in detail in the drawings and, for example, could consist of a vertically disposed steel case joined at the top and the bottom by two suitably reinforced steel bulk heads to form a substantially rectangular enclosure containing a plurality of vertically arranged straight tubes arranged in such a manner to enable the mixture of gases and fine particles to flow through the tubes in parallel. The mixture of gases and discharged fine particles from the injection lines 64 thus enter the openings formed in the upper bulk head of the heat exchanger 70C, pass through the tubes in a heat exchange relation to air flowing through the rectangular enclosure and out through the openings formed in the lower bulk head before exiting the heat recovery enclosure 66 through an outlet 72.

The walls forming the upper portions of the separation section 46 and the heat recovery enclosure 66 are formed by a plurality of vertically disposed tubes interconnected by vertically disposed elongated bars, or fins to form a contiguous, wall-like structure identical to the walls forming the reactor 18. The upper ends of these walls are connected to a plurality of horizontally-extending upper headers 74, and the lower ends of the walls are connected to a plurality of horizontally extending lower headers, one of which is shown by the reference numeral 76.

Although not shown in the drawing it is understood that water flow circuitry, including downcomers, risers and the like, are provided to connect the steam drum 12 and/or a water drum (not shown) to the headers 26, 28, 74, and 76 to form a flow circuit for the water and steam through the steam drum 12, the water drum and the walls forming the reactor 18, the walls forming the separating section 46, the superheaters 70A and 70B and the heat exchanger 70C and the walls forming the heat recovery enclosure 66. Since this is a conventional technique it will not be described any further.

In the operation of the steam generator 10, a quantity of fuel and sorbent particles, such as coal and limestone, are introduced through the distributor 38 (and other distributors as needed) and build up on the upper surface of the plate 30 to form the bed 34. Air is introduced into the plenum chamber 32 at a relatively high pressure, and the particles are ignited by burners (not shown). Alternatively, the particles can be warmed up by a burner located in the plenum chamber 32. The primary air introduced through the plenum chamber 32 comprises a fraction of the total air required for complete combustion of the coal so that the combustion in the lower section of the furnace 24 is incomplete. The latter section thus operates under reducing conditions and the remaining air required for complete combustion of the coal is supplied by the air ports 42. When operating at maximum capacity, the range of air supplied through the plenum chamber 32 can be from 40% to 90% of this required for complete combustion, with this amount varying according to the desired bed temperature, while the remaining air (60% to 10%) is supplied through the ports 42 to complete the combustion.

The high-pressure, high-velocity, combustion-supporting air introduced through the air distribution plate 30 from the plenum chamber 32 causes the relatively fine particles of coal and limestone including coal ash and spent limestone, to become entrained within, and to thus be pneumatically transported by, the combustion gases. This mixture of entrained fine particles and gas rises upwardly within the furnace 24 to form a gas column containing the entrained fine particles and passes from the reactor 18 through the opening 44 and into the separating section 46.

The amount of relatively fine and coarse coal and limestone particles introduced into the furnace 24 by the distributor 38 is such that the gas column formed in the furnace 24 above the bed 34 is saturated with the fine particles, i.e. maximum entrainment of the fine particles by the gas is attained. As a result of the saturation, a portion of the fine particles are not entrained by the gas and, together with the relatively coarse particles, form the bed 34.

According to a feature of the present invention, the entrained fine particles pass upwardly through the length of the gas column in the furnace section 24 and exit from the reactor 18 through the opening 44. The fine particles are separated from the combustion gases within the separator 48, and are passed to the dipleg seal 52. The fine particles accumulate in the dipleg seal 52 which provides a pressure seal between the receiving end of the dipleg seal and the recycle conduit 54. Accordingly, the operating pressure of the bed 34 in the furnace 24 is not dependent on the operating pressure of the separator 48 so as to adversely effect the operating characteristics of either of these components. The head of fine particles in the dipleg seal 52 also provides a continuous downward bias tending to direct the material downwards toward the receiving end of the L-valve 56. The air injector 52a provides fluidizing air to the fine particles in the dipleg seal 52 to prevent slumping of the fine particles. The aeration tap 60 provides fluidizing air to the receiving end of the L-valve 56 and consequently, the flow of extracted fine particles through the L-valve is proportional to the air supplied to the aeration tap. In this manner, the L-valve 56 provides an adjustable flow control for extracted fine particles and is adjusted to vary the relatively portion of fine particles entering the conduit 54 and the pneumatic lift 58, and therefore the relative amount of fine particles re-entering the furnace 24 and discharging to the heat exchanger 70C, respectively. Consequently, the volume of the relatively fine particles recycled back to the reactor 18, via the conduit 54, and therefore the ratio of relatively fine particles to relatively coarse particles disposed in the reactor 18 can be precisely regulated.

It is understood that the introduction of the mixture of fine and coarse particles through the distributor 38 is maintained at proper levels to insure that the gas column above the bed 34 is saturated with the particles, notwithstanding the discharge of the spent materials from the drain 40 and the discharge of a portion of the fine particles from the injection line(s) 64. As an example, the solid particles can have a particle density varying from 60 lb/ft$^3$ to 160 lbs/ft$^3$, and the average particle sizes are approximately 750 to 1250 um for the coarse particles and 75-250 um for the fine particles.

Water is introduced into the steam drum 12 through the water feed pipe 14 where it mixes with water in the drum 12. Water from the drum 12 is conducted downwardly through downcomers or the like, into the lower headers 26 and the tubes forming the boiler walls 20a, 20b and 22, as described above. Heat from the fluidized bed, the gas column, and the transported solids converts a portion of the water into steam, and the mixture of water and steam rises in the tubes, collects in the upper headers 74, and is transferred to the steam drum 12. The steam and water are separated within the steam drum 12 in a conventional manner, and the separated steam is conducted from the steam drum by the steam pipes 16 to the superheaters 70A and 70B, the heat exchanger 70C and thereafter to a steam turbine, or the like. The separated water is mixed with the fresh supply of water from the feed pipe 14, and is recirculated through the flow circuitry in the manner just described. Other cooling surfaces, preferably in the form of partition walls with essentially vertical tubes, can be utilized in the furnace 24.

The hot clean gases from the separating section 46 pass over the superheaters 70A and 70B to remove heat from the gases and add heat to the relatively cool steam flowing through the superheaters, before the gases mix with the hot separated solids from the injection line(s) 64. The mixture passes over the heat exchanger 70C in a heat exchange relationship to the relatively cool fluid passing through the heat exchanger to remove additional heat from the mixture, before the mixture is discharged from the steam generator 10, via the outlet 72.

It is thus seen that, according to the system and method of the present invention, the ratio of recycled to discharged fine particles can easily be varied by adjusting the volume of air to the aeration tap 60. Thus, the ratio of the relatively course particles to the relatively fine particles in the reactor can be regulated by adjusting the particle discharge from the drain pipe 40 and by adjusting the volume of air to the aeration tap 60, respectively. Consequently, the residence time of both the relatively coarse and fine particles disposed in, and circulating through, the reactor 18 can be adjusted to suit their respective reacting characteristics which provides for increased operational efficiency at low operational loads. Also, heat is recovered from the extracted fine particles to further increasing operational efficiency.

Although not specifically illustrated in the drawings, it is understood that other additional and necessary equipment and structural components will be provided, and that these and all of the components described above are arranged and supported in an appropriate fashion to form a complete and operative system.

It is also understood that variations may be made in the system and the method of the present invention without departing from the scope of the invention. For example, the fuel supplied to the reactor can be in liquid or gaseous form rather than in the particulate solid form as described. Other variations can be made by those skilled in the art without departing from the scope of the invention as defined in the appended claims.

What is claimed is:

1. A method of operating a fluid bed reactor comprising the steps of introducing a particulate material including fuel into a vessel for combustion, introducing air into said vessel and through said particles to fluidize said particles and support said combustion, said air mixing with the gaseous products of combination and entraining a portion of said particles, separating said entrained particles from said mixture of air and gaseous products of combustion, passing said separated mixture of air and gaseous products of combustion to a heat recovery area, dividing said separated particles into two portions, recycling one portion of said separated particles back to said vessel, passing said other portion of said separated particles to said heat recovery area, and removing heat from said separated mixture of air and gaseous products of combustion and said other portion of said separated particles in said heat recovery area.

2. The method of claim 1 further comprising the step of passing air through said other portion of said separated particles before said particles are passed to said heat recovery area.

3. The method of claim 1 further comprising the step of combining said separated mixture of air and gaseous products of combustion and said other portion of said separated particles in said heat recovery area.

4. The method of claim 21 wherein said particulate material includes relatively coarse and relatively fine solid particles and further comprising the step of controlling the velocity of said air so that it is sufficient to entrain said fine particles and insufficient to entrain said coarse particles so that said coarse particles form a discrete fluidized bed in the lower portion of said vessel.

5. The method of claim 4 wherein a portion of said relatively fine particles are entrained by and separated from said mixture and divided into said two portions.

6. The method of claim 1 further comprising the step of varying the relative portions of separated particles recycled back to the vessel and passed to said heat recovery area to vary the relative portions of relative fine particles and relatively coarse particles in said bed.

7. The method of claim 1 wherein said air is introduced in quantities below that required for complete combustion of said fuel, and further comprising the step of introducing an additional quantity of air to said vessel at a location above the area of introduction of said first quantity of air, the quantity of said additional air being sufficient to completely combust said fuel.

8. The method of claim 1 further comprising the step of controlling the temperature of said bed by varying the quantity of air introduced to said bed.

9. The method of claim 1 further comprising the step of circulating water through said vessel to absorb the heat from said combustion and convert said water to steam.

10. The method of claim 1 further comprising the steps of discharging relative coarse spent particles from said bed and varying the rate of said discharge to adjust the residence time of said particles in said vessel.

11. The method of claim 10 wherein said step of varying varies the ratio of relatively fine particles to relatively coarse particles in said bed.

12. A fluidized bed reactor system comprising a vessel, a fluidized bed of combustible particles disposed in said vessel, separating means for receiving a mixture of air, gaseous products of combustion and entrained particles from said fluidized bed in said vessel and separating said entrained particles from said mixture of air and gaseous production of combustion, heat recovery means, means for passing said separated mixture of air and gaseous products of combustion to said heat recovery means, means for passing one portion of said separated particles back to said vessel, and means for passing the other portion of said separated particles to said heat recovery means, said heat recovery means adapted to remove heat from said separated mixture of air and gaseous products of combustion and said other portion of said separated particles.

13. The system of claim 12 further comprising a dipleg seal for receiving said separated particles and dividing said particles into said one portion and said other portion.

14. The system of claim 13 further comprising means for distributing air through said separated particles in said dipleg seal to fluidize same.

15. The system of claim 12 further comprising means for varying the relative portions of separated particles passed back to the vessel and separated particles passed to said heat recovery means.

16. The system of claim 12 further comprising means for circulating water through said vessel to absorb the heat from the combustion of said particles and convert said water to steam.

* * * * *